US00RE37268E

(19) United States
(12) Reissued Patent
Scheidt et al.

(10) Patent Number: US RE37,268 E
(45) Date of Reissued Patent: Jul. 10, 2001

(54) ADJUSTING CYLINDER OF A CAMSHAFT ADJUSTING DEVICE ACTED UPON BY A SEPARATE OIL SUPPLY UNIT

(75) Inventors: Martin Scheidt, Adelsdorf; Andreas Strauss, Herzogenaurach, both of (DE)

(73) Assignee: INA Wälzlager Schaeffler OHG, Herzogenaurach (DE)

(21) Appl. No.: 09/498,127

(22) Filed: Feb. 2, 2000

Related U.S. Patent Documents

Reissue of:
(64) Patent No.: 5,915,348
Issued: Jun. 29, 1999
Appl. No.: 08/953,802
Filed: Oct. 8, 1997

U.S. Applications:

(63) Continuation of application No. PCT/EP96/04867, filed on Nov. 7, 1996.

(30) Foreign Application Priority Data

Feb. 10, 1996 (DE) ..... 196 04 865

(51) Int. Cl.[7] ..... F01L 1/34; F01L 13/00
(52) U.S. Cl. ..... 123/90.17; 123/90.31; 123/90.33; 123/196 AB; 123/198 C
(58) Field of Search ..... 123/90.15, 90.17, 123/90.31, 90.33, 196 AB, 198 C

(56) References Cited

U.S. PATENT DOCUMENTS 4,890,695 * 1/1990 Morris et al. ..... 123/196 R
4,940,114 * 7/1990 Albrecht ..... 123/196 AB
5,170,755 * 12/1992 Kano et al. ..... 123/90.17
5,189,999 * 3/1993 Thoma ..... 123/90.17
5,195,474 * 3/1993 Urata et al. ..... 123/90.33
5,243,935 * 9/1993 Kano et al. ..... 123/90.17
5,247,914 * 9/1993 Imai et al. ..... 123/90.17
5,329,890 * 7/1994 Mueller ..... 123/90.17
5,509,383 * 4/1996 Kahrs et al. ..... 123/90.17
5,615,648 * 4/1997 Ruoff et al. ..... 123/90.17
5,704,317 * 1/1998 Barth ..... 123/90.17

FOREIGN PATENT DOCUMENTS 39 29 078 3/1991 (DE) .
42 27 001 2/1994 (DE) .

OTHER PUBLICATIONS

Patent Abstracts of Japan vol. 16, No. 578 (M–1346), Dec. 17, 1992 & JP 04 228815 A (Honda Motor Co. Ltd.), Aug. 18, 1992, see abstract.

* cited by examiner

*Primary Examiner*—Weilun Lo
(74) *Attorney, Agent, or Firm*—Henry M. Feiereisen

(57) ABSTRACT

A device provided on a internal combustion piston engine for changing the rotational relations between at least one camshaft (5) and a crankshaft (6) includes a hydraulic cylinder (4). This hydraulic cylinder (4) is acted upon by a supply unit (7, 14) which displaces gas cushions in the hydraulic cylinder (4) when the internal combustion piston engine is at a standstill and replaces the gas cushions with hydraulic cylinder, especially motor oil.

11 Claims, 2 Drawing Sheets

Figure 1:
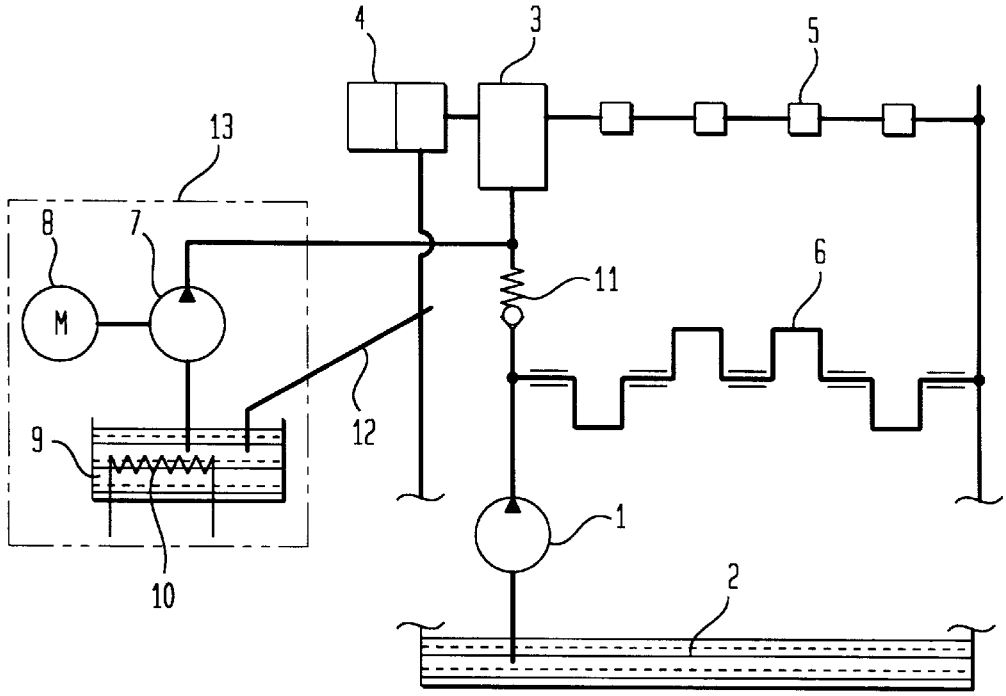

ADJUSTING CYLINDER OF A CAMSHAFT ADJUSTING DEVICE ACTED UPON BY A SEPARATE OIL SUPPLY UNIT

Matter enclosed in heavy brackets [ ] appears in the original patent but forms no part of this reissue specification; matter printed in italics indicates the additions made by reissue.

This application is a continuation of pending international application number PCT/EP96/04867, filed Nov. 7, 1996.

FIELD OF THE INVENTION

The present invention relates to a device disposed on an internal combustion piston engine for changing rotational relations between at least one camshaft and a crankshaft, with the device being provided with a hydraulic cylinder which is acted upon by hydraulic fluid by means of a supply unit driven by the internal combustion piston engine.

BACKGROUND OF THE INVENTION

A device of this type is known for example from WO-A 93 07 362. Linear adjusting movements of the hydraulic cylinder are converted by way of an actuator into a relative rotation of the camshaft in respect to the crankshaft. Such an actuator can be positioned between a pinion and the camshaft with the pinion being driven by the crankshaft via a traction means. The actuator which is placed coaxially with respect to the pinion and the camshaft can be provided with a helical teeth or with a straight teeth, whereby these teeth cooperate with mating teeth associated with the camshaft and the pinion. When the hydraulic cylinder is operated, the actuator is axially displaced in relation to the pinion and the camshaft, whereby the helical teeth cause the camshaft to rotate relative to the pinion and thereby also relative to the crankshaft. An oil pump is driven by the camshaft of the internal combustion engine in a manner known in the art. In these conventional devices, the motor oil is empoyed as a hydraulic fluid for acting on the hydraulic cylinder. When the engine stops, the pressure in the hydraulic cylinder decreases to zero and motor oil leaks out of the hydraulic cylinder. During start of the engine, the oil pump is not yet capable of building up pressure. In the event the engine is started after it was shut down for an extended period of time, motor oil stored in the cylinder will have leaked out to such an extent that compressible gas cushions are formed in the cylinder. Consequently, the piston is able to move linearly inside the pressure chambers even if the pressure chambers are sealed off. The alternating torque transmitted by the camshaft to the actuator exerts axial forces onto the actuator caused by the described helical teeth. These axial forees cause undesirable oscillatory movements of the actuator as a consequence of the compressible gas cushions.

It is thus an object of the present invention to reliably eliminate these undesirable movements of the actuator.

SUMMARY OF THE INVENTION

This object is solved in accordance with the invention by displacing gas cushions encountered in the hydraulic cylinder by means of the supply unit immediately before and/or during the starting operation of the internal combustion piston engine and replacing these gas cushions with hydraulic fluid, in particular motor oil. This supply unit is activated before the engine is started, for example, during ignition or during preheating the motor. Alternatively, the supply unit according to the invention can also be activated during rotation of the starter of the motor. Of course, there could also be provided a circuit for operating the supply unit when the ignition is started and the starter turns. A supply unit of this type can, for example, be formed by a second oil pump driven by an electromotor which is provided in addition to the conventional first oil pump that is driven by the internal combustion piston engine. This elctromotor is preferably operated by the battery provided in the motor vehicle. This second oil pump can be located directly in a pump well of the oil pan, but also in the cylinder head. Depending on the location of the second oil pump, there can be provided an oil reservoir separate from the oil pan from which reservoir the second oil pump draws. In particular at low temperatures, it may be suitable that motor oil preheated in a preheater is then transported to the hydraulic cylinder by the second oil pump. This preheater may, for example, be located in the separate oil reservoir. This preheater can also be operated by the car battery in a same manner as the second oil pump. A heat reservoir can also be employed instead of or together with the prebeater. Since in particular the automobile industry now requires increasingly assembled subsystems, it is suitable to form the separate oil reservoir, the second oil pump, the electromotor and the preheater as a structural unit. This structural unit can then simply be flange-mounted on the engine.

It is also feasible to provide the supply unit in the form of an oil pump which can be driven by the internal combustion piston engine as well as by an electromotor, with a coupling unit being provided for selectively coupling the oil pump to the electromotor or to the internal combustion piston engine. This can be implemented, for example, by using two conventional freewheel clutches, with one of the clutches being connected between the oil pump and the crankshaft and the other clutch being connected between the oil pump and the electromotor.

In order to ensure that the separate oil reservoir is continuously filled with motor oil, a return line is proposed which leads into the separate oil reservoir. Excess motor oil is thereby returned to the oil pan and the oil reservoir, so that motor oil is again transported from the filled oil reservoir to the hydraulic cylinder when the ignition is started the next time.

The supply unit, however, can also be implemented in form of a hydraulic accumulator. The liquid stored in this device is under pressure by a spring, a gas or a weight. The stored energy is released again in form of a liquid flow under pressure. Suitably, a disengageable check valve may for example be so arranged between the hydraulic accumulator and the hydraulic cylinder that the motor oil can flow from the hydraulic accumulator into the cylinder upon ignition and released check valve.

It is suitable, to connect a disengageable check valve between between the hydraulic accumulator and the hydraulic cylinder, with the check valve being releasable by an electromagnet and closing in the direction of the hydraulic cylinder. The electromagnet can, for example, be actuated simultaneously with the ignition. Before the engine starts, motor oil is pumped into the hydraulic cylinder through the open check valve, thereby displacing existing gas cushions.

Figure 2:
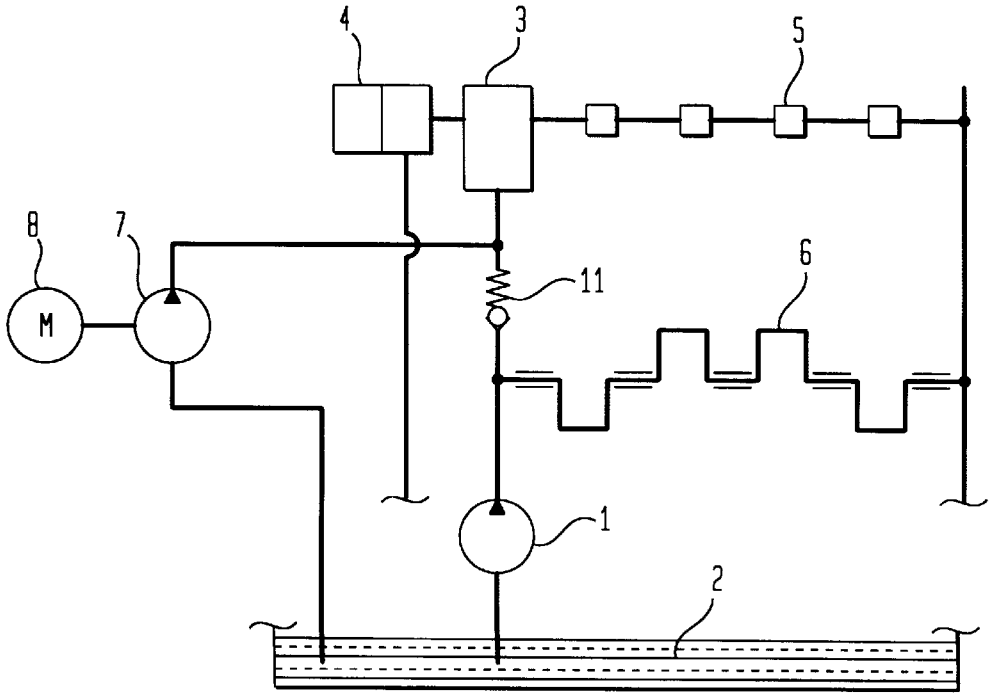
Figure 3:
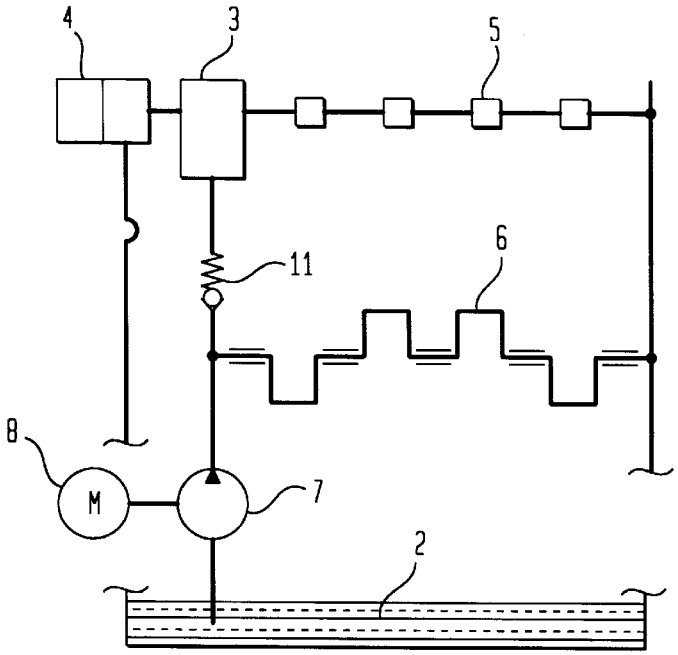
Figure 4:
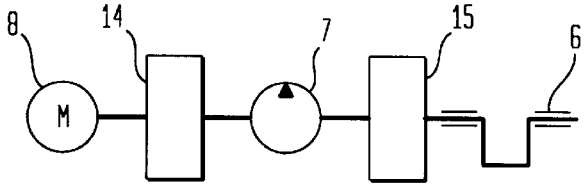
Figure 5:
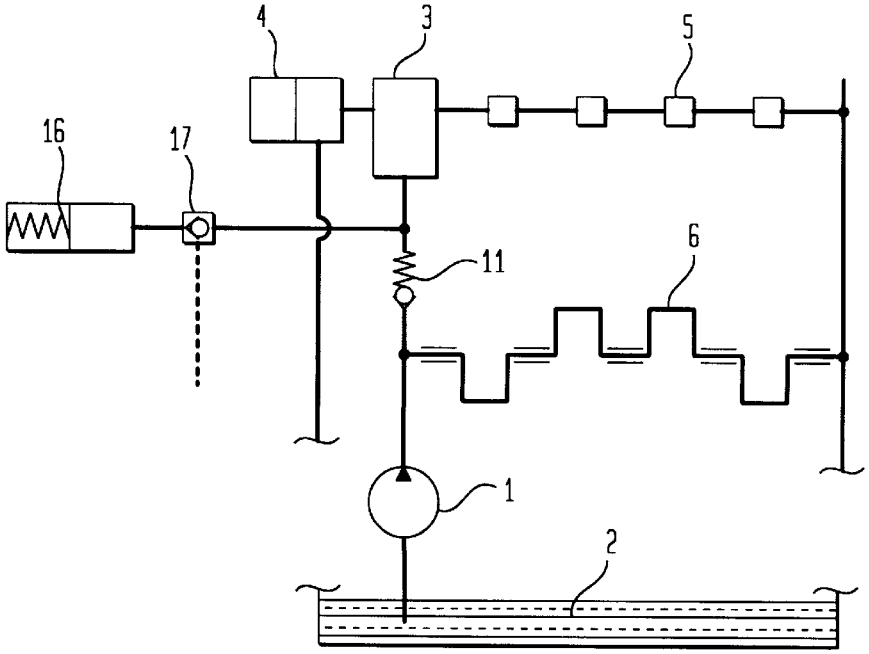

The invention will be described hereinafter with reference to four embodiments depicted in five figures. It is shown in:

FIG. 1 a schematic illustration of a first device according to the invention;

FIG. 2 a schematic illustration of another device according to the invention;

FIG. 3 a schematic illustration of another device according to the invention;

FIG. 4 a schematic illustration of a pump drive of the device according to the invention from FIG. 3; and FIG. 5 a schematic illustration of another device according to the invention.

FIG. 1 shows schematically a device according to the invention. A first oil pump 1 driven by a internal combustion piston engine delivers motor oil from an oil pan 2 via a control unit 3 into a hydraulic cylinder 4, which is not explicitly shown in the figure. The hydraulic cylinder 4 can be of single acting or double acting type. The hydraulic cylinder 4 is part of an assembly (not shown in detail) for changing the rotational relations between at least one camshaft 5 and a crankshaft 6. It is evident from the schematic illustration that both the camshaft 5 and the crankshaft 6 are lubricated with motor oil supplied by the first oil pump 1. The control unit 3 controls—as a function of various current parameters, such as the camshaft speed—the manner in which the hydraulic cylinder 4 is acted upon and consequently the changes in the rotational relation between the camshaft 5 and the crankshaft 6. Moreover, there is provided a second oil pump 7 driven by an electromotor 8. The second oil pump 7 delivers motor oil from an oil reservoir 9 via the control unit 3 to the hydraulic cylinder 4. The oil reservoir 9 is provided with an electrically operated preheater 10. Provided between the two oil pumps 7,1 is a check valve 11 which closes in the direction of the first oil pump 1. When, for example, the ignition is on, the electromotor 8 is started, with oil being supplied from the oil reservoir 9 via the control unit 3 to the hydraulic cylinder 4. The control unit 3 releases thereby the connection between the second oil pump 7 and the hydraulic cylinder 4. The delivered motor oil is prevented from returning to the oil pan 2 via the first oil pump 1, since the provided check valve 11 blocks the return path. During this operation, the crankshaft 6 and therefore also the camshaft 5 stand still. Any gas cushions prevalent in the hydraulic cylinder 4 are displaced and replaced by the incoming motor oil. After conclusion of this process, the internal combustion piston engine can be started. This guarantees that oscillating adjustment movements of the hydraulic cylinder 4 as a consequence of gas cushions are eliminated. In order to ensure that the oil reservoir 9 is always filled, motor oil discharged from the hydraulic cylinder 4 is returned to the oil reservoir 9 through a return line 12.

Oil returning from the cylinder head can also be used for filling the oil reservoir 9. In the illustration, the oil pump 7, the electromotor 8, the oil reservoir 9 and the preheater 10 are arranged inside a rectangle as indicated by broken lines, to symbolize a structural unit 13 formed of components recited above.

The further device according to the invention shown schematically in FIG. 2 is distinguished from the device of FIG. 1 mainly by the elimination of the oil reservoir 9, the preheater 10 and the return line 12. In this illustration, the oil pump 7 draws the motor oil directly from the oil pan 2.

The device according to the invention shown schematically in FIG. 3 is distinguished from the device of FIG. 2 mainly in that the first oil pump 1 is eliminated completely and replaced by the second oil pump 7. In order to ensure after start of the engine that there is no need to continuously drive the second oil pump 7 by the electromotor 8, it is suitable to provide, as shown in FIG. 4, a coupling unit in the form of, for example, two freewheel clutches 14, 15. The one freewheel clutch 14 is positioned between the electromotor 8 and the second oil pump 7, whereas the other freewheel clutch 15 is situated between the second oil pump 7 and the crankshaft 6. When the electromotor 8 is switched off and the crankshaft 6 rotates, the freewheel clutch 15 is engaged and the freewheel clutch 14 is disengaged, i.e. in override mode. Conversely, when the crankshaft 6 is stopped and the electromotor 8 rotates, the freewheel clutch 14 is engaged and the freewheel clutch 13 is disengaged, i.e. in override mode. In this way, it is ensured that the two drive modes do not interfere with one another.

The further device according to the invention shown schematically in FIG. 5 is distinguished from the devices of FIGS. 1 and 2 in the replacement of the second oil pump 7 and the electromotor 8 with a spring-biased hydraulic accumulator 16. Provided between the hydraulic accumulator 16, on the one hand, and the control unit 3 and the hydraulic cylinder 4, on the other hand, is a releasable check valve 17 which clears, for example, when the ignition is on. When the check valve 17 is cleared and the crankshaft 6 is at a standstil, the hydraulic accumulator 16 pushes the motor oil via the control unit 3 into the hydraulic cylinder 4. It may be suitable to maintain the released check valve 17 in the cleared position even in the event the internal combustion engine and hence the first oil pump 1 run. In this case, it is possible to refill the hydraulic accumulator 16 with motor oil, with the releasable check valve 17 being locked at the end of the filling operation.

We claim:

1. A device provided on an internal combustion piston engine for changing rotational relations between at least one camshaft and a crankshaft, said device comprising:

a hydraulic cylinder;

a supply system for supplying hydraulic fluid to act upon the hydraulic cylinder, said supply system displacing gas cushions prevalent in the hydraulic cylinder and replacing the gas cushions with hydraulic fluid at least in one of the phases selected from the group consisting of before starting operation of the internal combustion piston engine and during starting operation of the internal combustion piston engine; and a control unit positioned between the hydraulic cylinder and the supply system, said control unit being so configured as to effect before starting operation of the internal combustion engine a supply of hydraulic fluid from the supply system to the hydraulic cylinder.

2. The device of claim 1 wherein the supply system includes a first oil pump driven by the internal combustion piston engine and a second oil pump driven by an electromotor for acting upon the hydraulic cylinder.

3. The device of claim 2 wherein separated from an oil pan of the internal combustion piston engine there is provided a separate oil reservoir from which the second oil pump draws oil.

4. The device of claim 3 wherein motor oil preheated by a preheater is transported to the hydraulic cylinder by the second oil pump.

5. The device of claim 4 wherein the preheater is located in the separate oil reservoir.

6. The device of claim 4 wherein the separate oil reservoir, the second oil pump, the electromotor and the preheater are formed as a single structural unit.

7. The device of claim 1 wherein the supply system is formed by an oil pump which is driveable by the internal combustion piston engine as well as by an electromotor, with a coupling unit being provided for selectively coupling the oil pump to the electromotor or to the internal combustion piston engine.

8. The device of claim 3, and further comprising an oil return line connected from the hydraulic cylinder to the separate oil reservoir.

9. The device of claim 1 wherein the supply unit is formed by a hydraulic accumulator.

10. The device of claim 9, and further comprising a check valve provided between the hydraulic accumulator and the hydraulic cylinder, said check valve being releasable in the direction of the hydraulic cylinder.

11. The device of claim 1 wherein the hydraulic fluid is motor oil.

* * * * *